United States Patent [19]
Kolensky et al.

[11] 3,883,690
[45] May 13, 1975

[54] JUNCTION UNIT ALTERNATIVELY PROVIDING BRANCH LINE BROADCASTING OF DATA AND BRANCH LINE SELECTION

[75] Inventors: Leo Michael Kolensky, Irvington; Randolph John Pilc, Holmdel; Walter Rudolph Schaefer, Wall Township, Monmouth; Allan Howard Willand, Loch Arbour, all of N.J.

[73] Assignee: Bell Telephone Laboratories, Incorporated, Murray Hill, N.J.

[22] Filed: Dec. 19, 1973

[21] Appl. No.: 426,333

[52] U.S. Cl. .................................... 178/73; 340/151
[51] Int. Cl. .......................... H04h 9/00; H041 25/20
[58] Field of Search .................. 178/73, 69 R, 69 G; 325/31; 340/151, 168 R, 147 R, 163

[56] References Cited

UNITED STATES PATENTS

| | | | |
|---|---|---|---|
| 3,002,053 | 9/1961 | Gilman et al. | 178/73 |
| 3,435,142 | 3/1969 | Crowson et al. | 178/73 |
| 3,786,424 | 1/1974 | McVoy et al. | 340/151 |

*Primary Examiner*—Thomas A. Robinson
*Attorney, Agent, or Firm*—Roy C. Lipton

[57] ABSTRACT

A symmetrical junction unit interconnects a plurality of branch lines which extend to line loops of data stations. Normally, data signals on any branch from the data station connected thereto are broadcast by the junction unit to all other branches and supervisory control signals are blocked. When it is desired to test a branch line, signaling equipment connected to one designated branch signals the junction unit to select the desired branch. The junction unit, in response thereto, permits the interchange of both data and control signals between the one designated branch and the selected branch and blocks all the unselected branches. In one embodiment, branch lines are arranged to accommodate half-duplex signaling during the normal mode and full-duplex signaling during testing.

8 Claims, 7 Drawing Figures

JUNCTION UNIT ALTERNATIVELY PROVIDING BRANCH LINE BROADCASTING OF DATA AND BRANCH LINE SELECTION

FIELD OF THE INVENTION

This invention relates to data communication networks and, more particularly, to network hubs or junctions for broadcasting data to branch lines interconnected thereto.

DESCRIPTION OF THE PRIOR ART

A private line data network shared, in parallel, by a plurality of line stations is known as a multipoint or party line. Each station has the capability of sending and receiving data over a line loop extending to a central office of the common carrier. At the central office, the line loop is connected to a branch line which is coupled to other similar branch lines by a hub or junction unit. Each of these other branch lines may be connected to another station or may extend to another junction unit in the same or in another central office. The multipoint line is formed by all of the branch lines coupled to the interconnected hubs.

In one type of multipoint line, all communication, to and from a line station, is with a control location. This type of line requires a "non-symmetrical" junction unit which broadcasts data from the control location to all the line station branch lines and "combines" the line station branch lines to send data from line stations to the control station channel, subject to the condition that only one line station, at a time, can send to the control station. In another type of multipoint line, each line station communicates with all of the other line stations. This latter type of multipoint line requires a "symmetrical" junction unit which broadcasts data from any branch to all of the other branches, subject to the condition that a line station can receive broadcasted data from only one other station at a time.

It is conventional for the common carrier to provide appropriate administrative or housekeeping functions for the network, which functions include the signaling of normal idle branch conditions and abnormal trouble or out-of-service line conditions and further include the testing of equipment in the network. Supervisory control signals for signaling these line or equipment conditions are reserved by the common carrier and each branch line is capable of sending appropriate ones of these reserved supervisory signals to the hub. When trouble appears on one of the branch lines, an attendant at the junction unit, upon ascertaining that a branch line is in trouble, operates the test equipment to send test signals back down the branch line, testing the equipment thereon and displaying the responses from the tested equipment.

It is desirable to locate testing equipment where it has the capability of reaching all the branch lines. In the application of S. M. Fitch-L. M. Kolensky-J. C. Panek-D. C. Rife-W. R. Schaefer, Ser. No. 309,207, filed Nov. 24, 1972, there is disclosed a multipoint network provided with a control station and with non-symmetrical junction units. Each junction unit blocks the passage of supervisory control signals from the branch lines to the main channel to preclude "idle" supervisory signals from idle channels being combined with the data from the sending branch station. The testing equipment is located on the main line and, if a branch line is to be tested, the junction unit permits passage therethrough of both data and supervisory signals from the branch line under test and excludes intercommunication with the other branch lines.

It is an object of this invention to provide a symmetrical junction unit which is arranged to accommodate housekeeping functions. It is a more specific object of this invention to provide supervisory control signaling between a branch line of a symmetrical junction unit, which branch line extends to testing or control equipment, and a selected one of the other branch lines.

The line loop extending to the line station may accommodate either full-duplex signaling (simultaneous two-way) or half-duplex signaling (one way at a time). It is conventional for the common carrier to utilize full-duplex signaling between the junction unit and the branch under test. If the branch extends to a half-duplex station however, the junction unit must, during the normal data mode, limit signaling with the branch line to half-duplex.

It therefore is another object of this invention to provide a symmetrical junction unit which is arranged to alternatively communicate with a branch line on a full-duplex and a half-duplex basis.

SUMMARY OF THE INVENTION

In accordance with this invention, all of the branches of a multibranch symmetrical junction unit, including one branch extending to testing or control equipment, are normally arranged to broadcast incoming data signals and to block incoming supervisory control signals. When branch selection signals are received, however, all incoming signals from the control branch and the selected branch are repeated while all incoming signals from the unselected branches are blocked, enabling the control branch and the selected branch to interchange both data and control signals.

It is a feature of this invention that broadcasting of signals to unselected branch lines is precluded. Blocking incoming signals from the unselected branches and precluding broadcasting to the unselected branches provides an exclusive interconnection between the control branch and the selected branch.

In accordance with one embodiment of this invention, the branches of a multibranch symmetrical junction unit are arranged to normally communicate with half-duplex stations. More specifically, the reception of signals from and the broadcasting of signals to the branch line is limited to one way at a time. In the test mode, however, this limiting function is disabled to provide full-duplex communication between the control branch and the selected branch.

It is a feature of this invention that when the junction unit is in the normal data mode, the outgoing broadcasting of signals to each branch is blocked when incoming signals are received by the branch to thereby limit the branch to half-duplex signaling. More particularly, the incoming signals are monitored and broadcasting to the branch is blocked unless a data byte signaling an idle condition of the branch is received.

The foregoing and other objects and features of this invention will be more fully understood from the following description of an illustrative embodiment thereof taken in conjunction with the accompanying drawings.

Detailed DESCRIPTION

Figure 1:
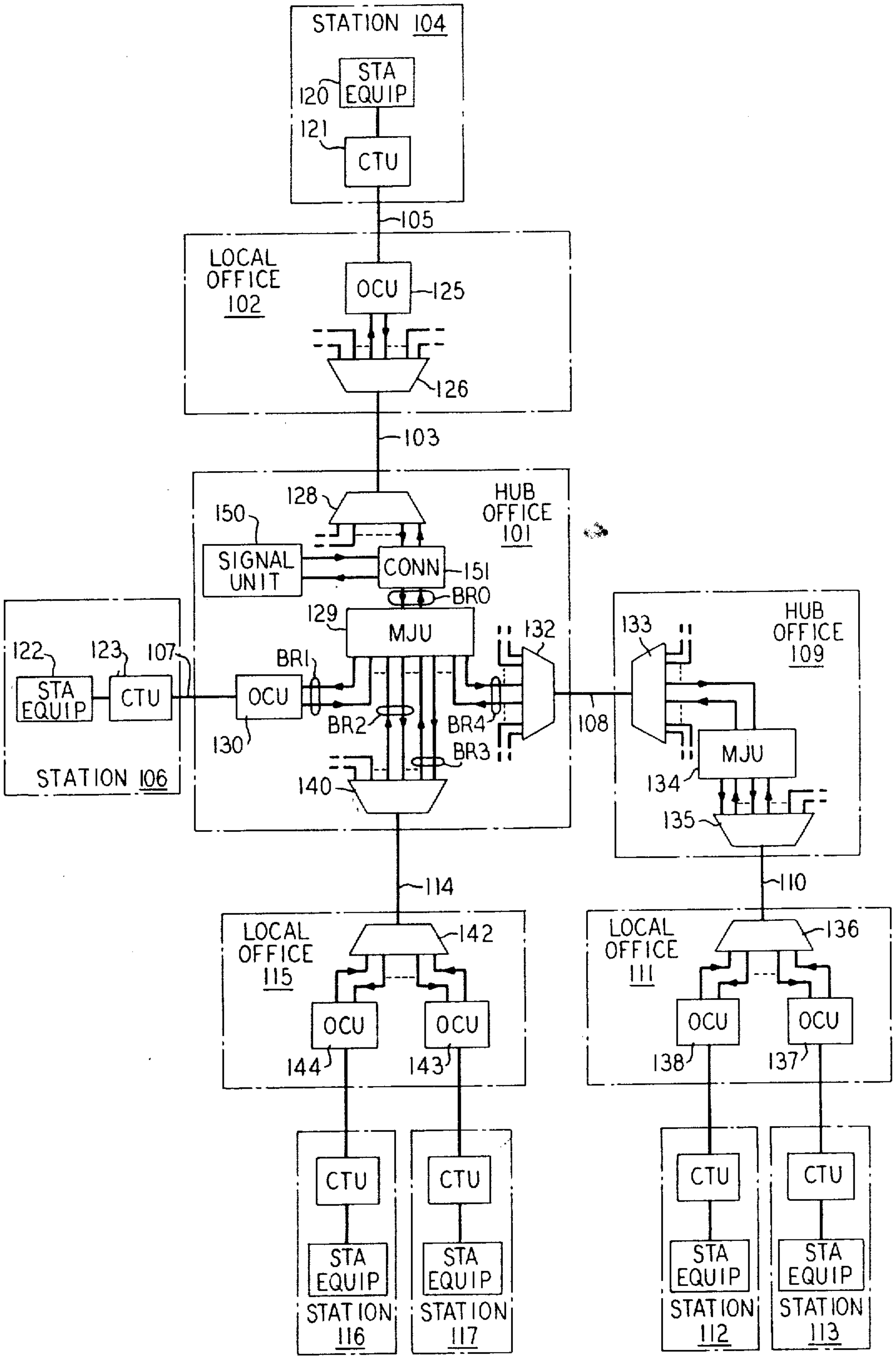
FIG. 1 shows, in block form, a multipoint network of branch lines coupled to interconnected symmetrical junction units.

The selective calling system as shown in FIG. 1 comprises stations 104, 106, 112, 113, 116 and 117 and an interconnecting network that interconnects the various stations. This interconnecting network includes hub offices 101 and 109 and local offices 102, 111 and 115. Station 104 is connected to local office 102 over two-way line loop 105, which line loop is arranged to accommodate line signaling in both directions. Similarly, each of the other stations is connected to a network hub or local office by way of a line loop which accommodates similar duplex line signaling. The offices are interconnected by way of two-way transmission trunks, local office 102 being connected to hub office 101 by way of two-way transmission trunk 103. Hub office 101 is, in turn, interconnected to hub office 109 and local office 115 by way of two-way trunks 108 and 114, respectively. Similarly, hub office 109 is interconnected with local office 111 by way of two-way trunk 110.

In general, the network operates in one of two modes; namely, a "data" mode and a "test" mode. When the network is in the data mode, data originating from any one of the stations is conveyed, either directly or by way of a local office, to a hub office and is then simultaneously broadcast out over trunks and line loops to all of the other stations. In accordance with one embodiment, the network accommodates line loops which provide full-duplex signaling; that is, simultaneous signaling, in both directions, to and from each station. In another embodiment disclosed hereinafter, the network accommodates half-duplex line loops which provide alternative signaling, to and from, each of the stations. In the test mode, control of the network is assumed by hub office 101, which, in cooperation with hub office 109, selects internal branches, loops or trunks and provides full-duplex signaling between the hub office and the selected one of these branches to the exclusion of other ones of the branches.

Each station consists of station equipment and a channel terminal unit, such as station equipment generally indicated by block 120 and channel terminal unit 121 in station 104. A station transmitter for sending data word messages and a station recorder for receiving data word messages are included in the station equipment of each station. In addition, the station equipment includes circuit equipment for starting the station transmitter or turning ON the station recorder. The channel terminal unit converts data words generated by the transmitter to appropriate line signals for application to the station loop, such as loop 105, and converts incoming line signals to corresponding data and address words for application to the station recorder.

Suitable station equipment for each station, such as station 104, is disclosed in U.S. Pat. No. 3,427,588, issued to P. T. Mauzey, C. J. Votaw and H. M. Zydney on Feb. 11, 1969.

It is contemplated that the network constitutes part of a digital data system and the local and hub offices are additionally arranged to multiplex data incoming on various channels for application to outgoing trunks and to demultiplex incoming data on trunks for application to outgoing channels, or for remultiplexing and application to outgoing trunks.

The local office connected to station 104 via loop 105 is local office 102. Local office 102 includes office channel unit 125 and multiplexer/demultiplexer 126. Office channel unit 125 receives the data transmission from station 104 and assembles the data into multibit bytes, writing a "1" bit into the eighth bit position of the byte to denote that the byte comprises a data (or address) word (as opposed to a supervisory control word which contains a "" bit in the eighth bit position). The data byte is then fed into one port of multiplexer/-demultiplexer 126 to be inserted into one time slot on trunk 103, while data bytes from other office channel units (not shown) in local office 102 are applied to other input ports of multiplexer/demultiplexer 126 for insertion into other time slots on trunk 103. The multiplexed bytes are then transmitted via the trunk to hub office 101.

The multiplexed data bytes from hub office 101 on trunk 103 are passed to multiplexer/demultiplexer 126, which distributes the data bytes in each time slot to individual output ports, such as the port connected to the path extending to office channel unit 125. Office channel unit 125, in turn, strips off the eighth bit of the byte, disassembles the byte and applies the corresponding line signals to loop 105 for transmission to station 104.

Although the specific circuitry for multiplexer/-demultiplexer 126 and office channel unit 125 for providing the above-described functions may comprise many different well-known arrangements, it is preferred that the circuitry be of the type disclosed in the copending application of A. C. Carney, M. P. Cichetti, Jr., J. G. Kneuer and D. W. Rice, Ser. No. 256,827, filed May 25, 1972.

The data transmitted to hub office 101 on trunk 103 is passed to multiplexer/demultiplexer 128 in the hub office. Multiplexer/demultiplexer 128, which is arranged in substantially the same manner as multiplexer/demultiplexer 126, distributes the data to its various output ports, applying to each port the data byte in the time slot corresponding to the port. The data bytes from office channel unit 125 are therefore provided to one port of multiplexer/demultiplexer 128, which port is connected to connector 151 and connector 151, in turn, is normally arranged to pass the data bytes to branch line BR0 of multipoint junction unit 129.

As described in detail hereinafter, it is normally the function of multipoint junction unit 129 to accept the data bytes on the incoming path of any branch line, such as branch BR0, and to broadcast the data bytes simultaneously to the outgoing paths of all of the other branches; multipoint junction unit 129 having five branches designated BR0, BR1, BR2, BR3, and BR4.

In one embodiment of multipoint junction unit 129, described in full detail hereinafter, the branch lines are arranged to be connected to full-duplex line loops and, in accordance therewith, multipoint junction unit 129 can also accept data bytes on the incoming path of another branch line, such as branch line BR1. In this event, branch line BR1 attempts to simultaneously broadcast these incoming data bytes to all of the other branches, resulting in concurrent transmission to the outgoing paths of branches BR2, BR3 and BR4 by two incoming branches and thus producing "garbage" or overwriting on these outgoing branches. The outgoing paths of branches BR0 and BR1, however, receive data from only one source; namely the incoming path of the branch to thereby achieve full-duplex interconnection between branches BR0 and BR1. In another embodiment of multipoint junction unit 129 the branches are arranged to be connected to half-duplex line loops. These branches include a "turn-around" circuit which precludes the acceptance of data by the outgoing path of the branch while data is being received by the incoming path of the branch. Accordingly, a branch cannot receive data while it is sending data to the multipoint junction unit and communication can take place by only one branch at a time. As described hereinafter, it is a feature of this invention that full-duplex signaling can be achieved by the half-duplex multipoint junction unit when the unit is in the testing mode.

Returning now to the reception of data on the incoming path of branch BR0 and the simultaneous broadcast of the data bytes to the outgoing paths of all the other branches, the data bytes on these outgoing paths of the four branches BR1, BR2, BR3 and BR4 are therefore simultaneously applied to office channel unit 130, an input port of multiplexer/demultiplexer 132 and two input ports of multiplexer/demultiplexer 140. The data bytes on the outgoing path of branch BR1 are converted to appropriate line signals by office channel unit 130 and passed by way of loop 107 to station 106. Data bytes on the outgoing paths of branches BR2 and BR3 are multiplexed by multiplexer/demultiplexer 140, data bytes on branch BR2 being applied to one time slot and data bytes on branch BR3 being applied to another time slot on two-way trunk 114 for passage to local office 115. Data bytes on the outgoing path of branch BR4 are inserted in a time slot of two-way trunk 108 by multiplexer/demultiplexer 132 for passage to hub office 109.

Line signals on line loop 107 from station 106 are converted to data bytes by office channel unit 130 and passed to the incoming path of branch BR1. Data bytes coming from local office 115 in two of the time slots on trunk 114 are distributed to two output ports of multiplexer/demultiplexer 140 connected to the incoming paths of branches BR2 and BR3. Data bytes coming from hub office 109 in one of the time slots on trunk 108 are applied to an output port of multiplexer/demultiplexer 132 connected to the incoming path of branch BR4. The data on the incoming path of any one of the several branches is distributed by multipoint junction unit 129 to the outgoing path of all of the other branches. The data on the outgoing path of branch BR0 is passed to connector 151. Connector 151 normally applies these data bytes to an input port of multiplexer/demultiplexer 128. These data bytes, in turn, are inserted in a time slot on trunk 103, transmitted to multiplexer/demultiplexer 126 in local office 102, and then applied to the output port connected to office channel unit 125 for transmission to station 104. The data bytes on the outgoing paths of the other branches of multipoint junction unit 129 are processed in the same manner described above with respect to incoming data on branch BR0.

Turning now to two-way trunk 108, data from hub office 101 is passed to multiplexer/demultiplexer 133 in hub office 109. Multiplexer 133 distributes the data to its various output ports and, specifically, applies the data from the outgoing path of branch BR4 of junction unit 129 to the output port which is connected to multipoint junction unit 134. Multipoint junction unit 134, in turn, broadcasts the data to outgoing paths of two branches, the two paths extending to input ports of multiplexer/demultiplexer 135. Multiplexer/demultiplexer 135 inserts the data into two time slots on two-way trunk 110. This data is then passed to local office 111 and, more specifically, to multiplexer/demultiplexer 136. Since the data is in two separate time slots, multiplexer/demultiplexer 136 applies the data to two separate output ports, which ports extend to office channel units 138 and 137. Each office channel unit, in turn, converts the data bytes to appropriate line signals for transmission to stations 112 and 113, respectively.

Line signals traveling from station 112 or 113 are transmitted to office channel units 138 and 137, respectively. The line signals are converted to data bits, assembled into data bytes and applied to the input ports of multiplexer/demultiplexer 136. Multiplexer/demultiplexer 136 inserts the data bytes from the office channel units into the appropriate time slots on two-way trunk 110. The bytes pass on trunk 110 to multiplexer/demultiplexer 135, which distributes the data bytes in each time slot to a corresponding one of its output ports. The output ports are connected to incoming paths of the two branches of multipoint junction unit 134 and multipoint junction unit 134, in turn, broadcasts the data from each of the two incoming branches to the outgoing paths of the other branches whereby the data is sent to the other one of stations 112 and 113 and is also applied to an input port of multiplexer/demultiplexer 133. The data bytes are inserted by multiplexer/demultiplexer 133 in a time slot on two-way trunk 108 and passed to multiplexer/demultiplexer 132, which distributes the data byte to an output port which is connected to the incoming path of branch BR4 of multipoint junction unit 129. Multipoint junction unit 129 broadcasts the data bytes in each of the incoming paths of the several branches, as previously described, simultaneously sending the data out over the outgoing paths of the other branches of multipoint junction unit 129.

The multiplexed data from the outgoing paths of branches BR2 and BR3 on two-way trunk 114 is passed to multiplexer/demultiplexer 142 in local office 115. Multiplexer/demultiplexer 142 applies the data bytes in the two separate time slots on trunk 114 to two separate output ports, which ports extend to office channel units 144 and 143, respectively. Each channel unit, in turn, converts the data bytes to appropriate line signals for transmission to stations 116 and 117, respectively.

Line signals transmitted by station 116 or station 117 are transmitted to the connected one of office channel units 144 and 143, respectively. The line signals are converted to data bits, assembled into data bytes and applied to input ports of multiplexer/demultiplexer 142. The multiplexer/demultiplexer inserts the data bytes into appropriate time slots on two-way trunk 114. The bytes are transmitted by way of trunk 114 to multiplexer/demultiplexer 140, which distributes the data bytes in each time slot to a corresponding one of its output ports. These output ports, as previously described, are connected to the incoming paths of branches BR2 and BR3. The data bytes are thus distributed by multipoint junction unit 129 to the other branches.

The above-described network can accommodate several different arrangements of data calling systems. For example, in accordance with one well-known type of data calling system, a station, such as station 104, may include control equipment, not shown, which selectively starts individual station transmitters by sending transmitter start codes. When connected to the network of FIG. 1, the control codes are transmitted from station 104 and broadcast to all of the other stations. The start codes start a station transmitter of another station and the station transmitter broadcasts a data message back to station 104 (and the other ones of the stations). For example, assuming the station transmitter of station 116 is started, the data message emitted therefrom is passed to local office 115. In local office 115 the data message is assembled by office channel unit 144 and applied to multiplexer/demultiplexer 142 which inserts the data message in a time slot on trunk 114. The data stream on trunk 114 is passed to hub office 101 and thus demultiplexed by multiplexer/demultiplexer 140. The demultiplexed data is then passed to the incoming path of branch BR2 of multipoint junction unit 129. This message is thus broadcast to all other branches and therefore to all other stations.

In some calling systems a called station can respond to a calling station and data information can be interchanged therebetween on either a full-duplex or half-duplex basis. Assuming that station 116 desires to "talk" to station 112, for example, it sends an address code to turn ON the recorder at station 112, followed by "message" data. This address travels from station 116 to multipoint junction unit 129 and is then broadcast to all stations, as previously described. The station 112 recorder is turned ON by the address signals and the following message data is thereby recorded. At station 112, the attendant thereat (or automatic equipment thereat) may decide to return message data. The station 112 transmitter is started (while the station 116 message is being received if the stations are full-duplex, or after the station 116 message is received, if the stations are half-duplex) and the station 116 address is transmitted, followed by message text. The data from station 112 passes to local office 111 and trunk 110 to hub office 109. These signals are then continued through trunk 108, as previously described, and then by way of multiplexer 132 and branch BR4 to multipoint junction unit 129 in hub office 101. The signal returned by station 112 is thus broadcast to the other stations and, since it includes the address signals for station 16, turns ON the station 116 recorder. Station 116 and station 112 thereby intercommunicate through the network on either a full-duplex or half-duplex basis.

In large networks, it is customary to provide supervisory or control signals within the network for various "housekeeping" functions. These functions include, for example, monitoring the conditions of the various lines, loops and trunks and testing and maintaining the various circuits and components within the network. A set arranged to provide for testing the various circuits and components in the network is shown in hub office 101 and is identified as signaling unit 150. Typical equipment for signaling unit 150 includes keyboard-controlled code generators for sending appropriate bytes which are transmitted to select lines and branches extending to the components to be tested and further includes recording and display apparatus for receiving, recording and displaying byte responses returned by the selected lines and branches and by the components under test. Certain of these bytes are designed control bytes and differ from data and address bytes insofar as a 0 bit is written into the eighth bit position. It is to be noted that when the network is in the normal data mode (as opposed to a test mode when signaling unit 150 is testing components), various branches and units may also transmit control bytes to the junction unit to identify conditions thereat, such as idle and out-of-service conditions.

In the normal mode, the multipoint junction unit is arranged to be transparent to all data (and address) bytes, as previously discussed. In addition, in the normal mode, control bytes are blocked by the multipoint junction unit, which converts each incoming control byte to a data byte having all 1's.

The multipoint junction unit is arranged to go into the test mode in response to a predetermined control byte passed to the incoming path of branch BRO by signaling unit 150. During the testing; signaling unit 150 and each multipoint junction unit, such as multipoint junction unit 129, have the capability of intercommunicating with at least nine different bytes, which are referred to as test bytes (the test bytes including both data bytes and control bytes). In this test mode, the multipoint junction unit initially blocks all of the incoming and outgoing paths of all the branches with the exception of the outgoing path of branch BRO. Thereafter, the junction unit unblocks the branch to be tested, which branch is selected by a test byte transmitted from signaling unit 150 and unblocks the incoming path of branch BRO. Branch BRO and the selected branch are rendered transparent to all data and control bytes, going both ways between signaling unit 150 and the branch under test. While this testing is proceeding, all transmission to and from the unselected branches is blocked. At the termination of the testing, a final test byte from signaling unit 150 restores the multipoint junction unit to its normal data mode. Certain of the test bytes are summarized as follows:

| Byte Identification | | Function |
|---|---|---|
| Test Alert (TA) | — | Control byte which initiates any test sequence |
| MJU Alert (MA) | — | Advises multipoint junction unit that testing is to proceed by way of the unit |
| Branch 1 (BR1) | — | Branch BR1 selection code |
| Branch 2 (BR2) | — | Branch BR2 selection code |
| Branch 3 (BR3) | — | Branch BR3 selection code |
| Branch 4 (BR4) | — | Branch BR4 selection code |
| "All 0's" | — | Control byte that indicates end of selection sequence |
| Idle | — | Control byte which indicates |

-Continued

| Byte Identification | | Function |
|---|---|---|
| | | end of testing sequence and otherwise identifies idle branch |
| Hub Identification (HID) | — | Identification of the hub; normally transmitted by the multipoint junction unit only |

Prior to the initiation of a testing sequence, connector 151 is manually operated to switch the two-way connection of multipoint junction unit 129 from multiplexer/demultiplexer 128 to signaling unit 150. An attendant at signaling unit 150 initiates the testing sequence by operating the keyboard to enable the code generators to send the TA control byte. Multipoint junction unit 129, in response thereto, goes to a preliminary test mode and blocks all the branches except BRO, with the exception that the incoming bytes on branch BRO from signaling unit 150 continue to be monitored. In the event that the junction unit is accommodating half-duplex stations, unit now disables the turn-around circuits to permit full-duplex signaling by branch BRO and by subsequently unblocked branches. In addition, the multipoint junction unit returns the TA control byte back to signaling unit 150, advising it that the multipoint junction unit has gone to this test mode. The signaling unit continues in the test sequence and sends the MA byte. Multipoint junction unit 129, in response thereto, returns the HID byte to signaling unit 150 for display thereat to identify that the multipoint junction unit (at the corresponding hub office) is in the test mode.

The branch selection byte or bytes of the branch or branches extending to the components, units or circuits to be tested is now transmitted by signaling unit 150 and multipoint junction unit 129 prepares to unblock this branch (or branches). At the same time, the multipoint junction unit returns the branch selection code byte to signaling unit 150 for display thereat to identify the branch (or branches) to be selected. Signaling unit 150 now sends the "All 0's " control byte and, at multipoint junction unit 129, branch BRO and the selected branch (or branches) are unblocked, the multipoint junction unit is rendered transparent to both data and control codes in both directions and the junction unit is rendered unresponsive to any subsequent selection codes. All other unselected branches remain blcoked; no data can be transmitted either way through these blocked branches. Signaling unit 150 may now control testing of units connected to the selected branch (or branches). At the termination of the testing, signaling unit 150 sends the Idle control byte to return multipoint junction unit 129 to the mornal mode.

In the event that it is desired to test units or components in hub office 109 or in local office 111, signaling unit 150 sends the branch selection byte BR4 and the All 0's byte after sending the TA and MA codes. This selects and unblocks branch BR4, whereby signaling unit 150 can intercommunicate by both data and control codes with multipoint junction unit 134 by way of branch BR4, multiplexer/demultiplexer 132, trunk 108 and multiplexer/demultiplexer 133. Signaling unit 150 again sends the TA control byte, placing multipoint junction unit 134 in the preliminary test mode. Multipoint junction unit 134 returns the TA code byte, signaling unit 150 sends the MA byte and multipoint junction unit 134 returns the HID byte. Signaling unit 150 now sends the appropriate branch selection byte to initiate the unblocking of the branch of multipoint junction unit 134 extending to the component to be tested. The branch selection code byte is returned by multipoint junction unit 134 and signaling unit 150 sends the All 0'equipment control byte to complete the selection. The testing of the quipment connected to the selected branch of multipoint junction unit 134 now proceeds in the same manner as the testing of equipment connected to multipoint junction unit 129. At the termination of the testing, signaling unit 150 sends the Idle control code byte, returning all intervening multipoint juntion units, such as multipoint junction unit 129 and multipoint junction unit 134, to their normal conditions.

It is to be noted that in the interchange of data bytes in a central office of the type disclosed in the above-identified copending application of A. C. Carney et al., various units repeat each byte five times (for example) to provide various advantages of flexibility, as disclosed in said copending application. Signaling unit 150 is, therefore, correspondingly arranged to repeat each byte five times (for example), utilizing substantially identical circuitry as the type disclosed in the copending application. Each multipoint junction unit, therefore, receives each control byte a corresponding plurality of times and, in general, provides the above-described functions in response to the first byte of the plurality that is received and detected. With respect to the functions of returning control bytes, the multipoint junction unit responds not only to the first byte received but responds to each subsequent byte, whereby each test byte returned by the multipoint junction unit is transmitted five times (for example) to render the signaling of the unit compatible with the signaling format of the office circuitry disclosed in the copending application of A. C. Carney et al.

Figure 2:
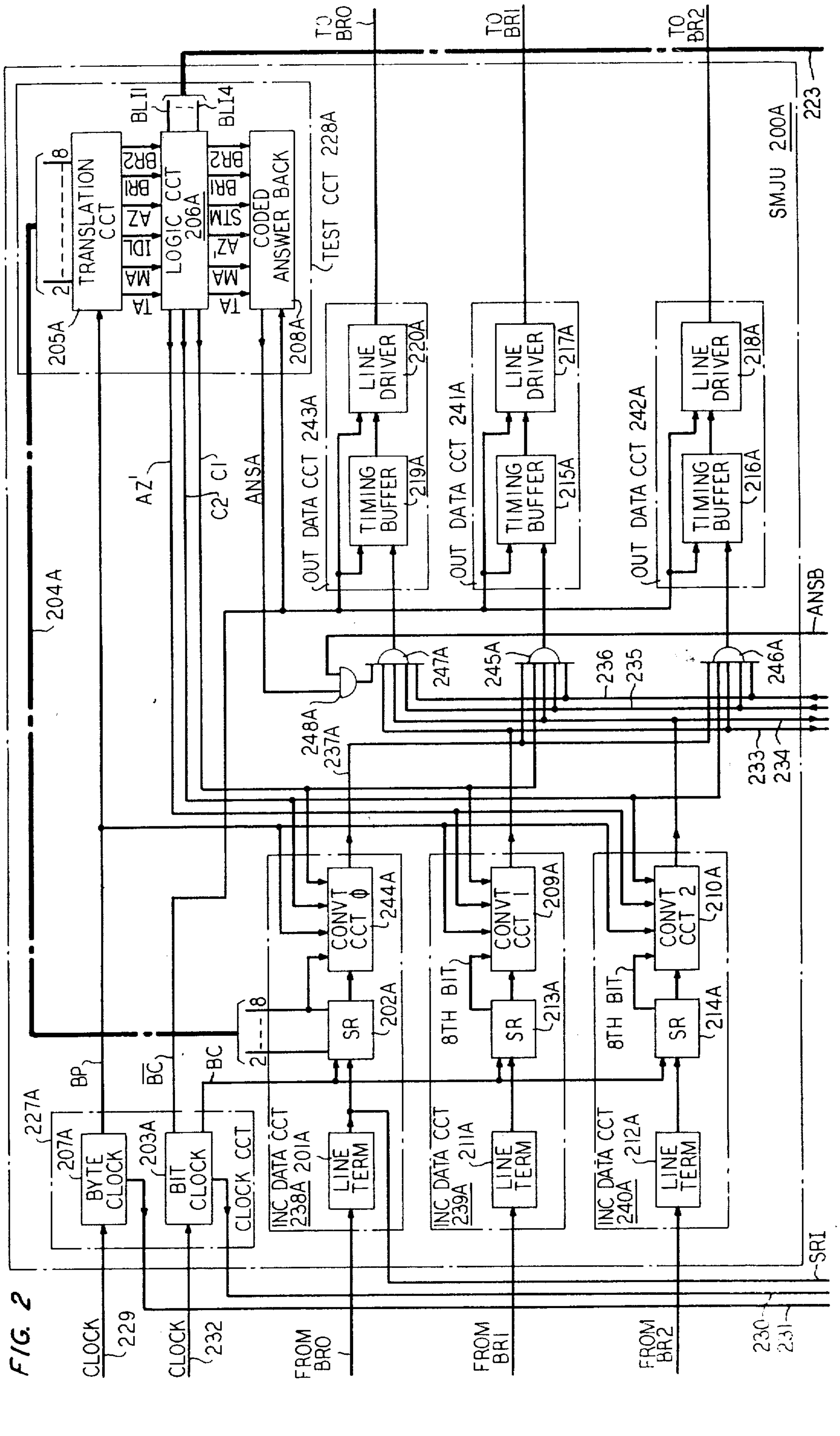
FIGS. 2 and 3, when vertically aligned, disclose, in schematic form, the details of circuitry and equipment of a five-branch symmetrical junction unit arranged to communicate with full-duplex line loops.
Figure 3:
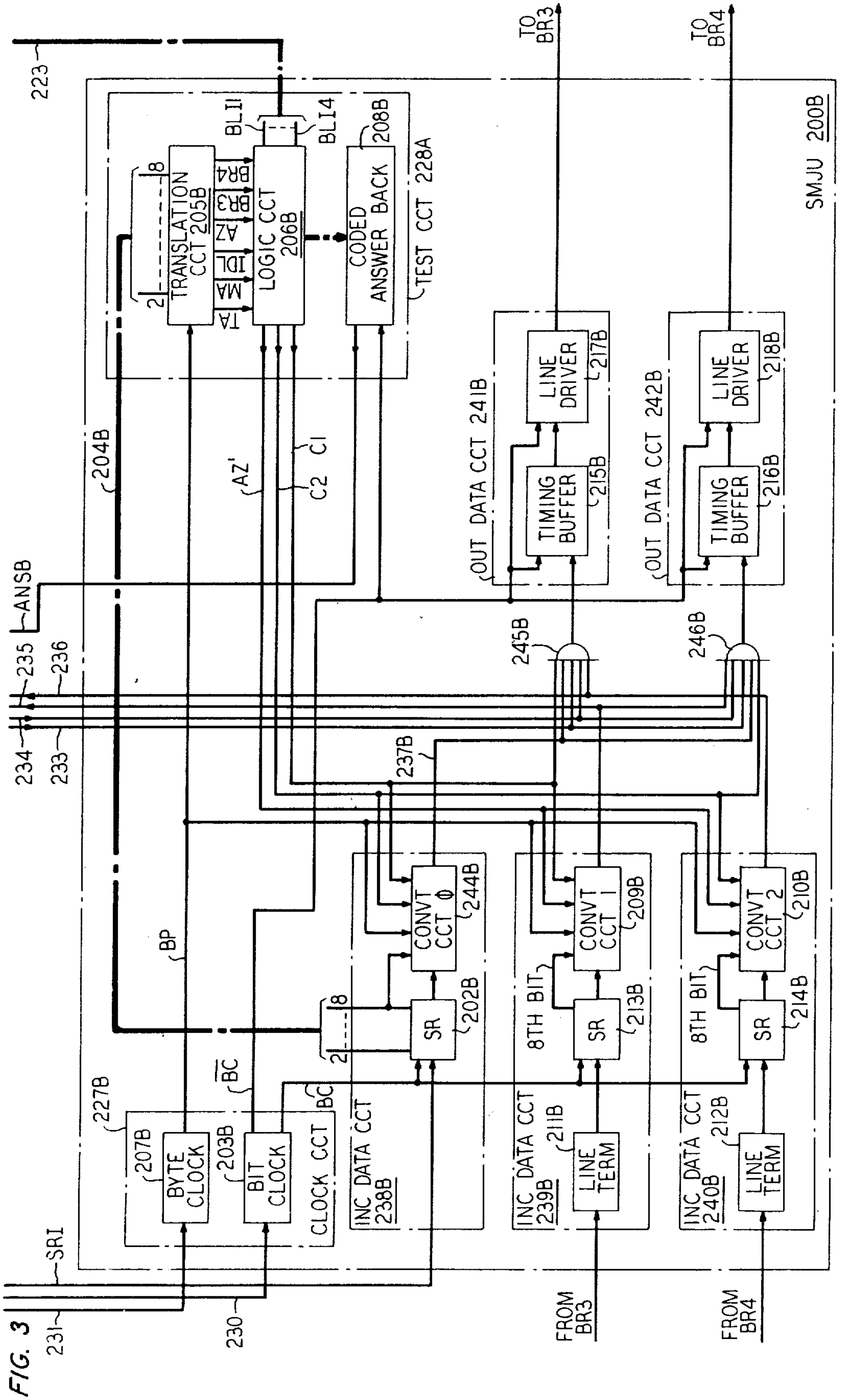

FIGS. 2 and 3 disclose a symmetrical five-branch multipoint junction unit, such as multipoint junction unit 129, when arranged to accommodate full-duplex signaling line loops. The five-branch multipoint junction unit consists of a three-branch junction circuit, identified as unit 200A, shown in FIG. 2, and two-branch unit 200b, shown in FIG. 3. It is to be understood that a threebranch multipoint junction unit, such as unit 134, is similar to unit 200A.

In general, three-branch unit 200A consists of nine major circuits. Eight of the major circuits are identified in FIG. 2 as incoming data circuits 238A, 239A, and 240A, outgoing data circuits 241A, 242A and 243A, clock circuit 227A, and test circuit 228A. The other major circuit consists of a gating matrix which includes gates 245A, 246A and 247A, and further includes AND gate 248A. Two-branch multipoint junction unit 200B includes corresponding circuits which are correspondingly identified as incoming data circuits 238B, 239B and 240b, outgoing data circuits 241B and 242B, clock circuits 227B and test circuit 228B. Unit 200B also includes gates 245B and 246B which cooperate with and form part of the gating matrix in unit 200A.

Figure 4:
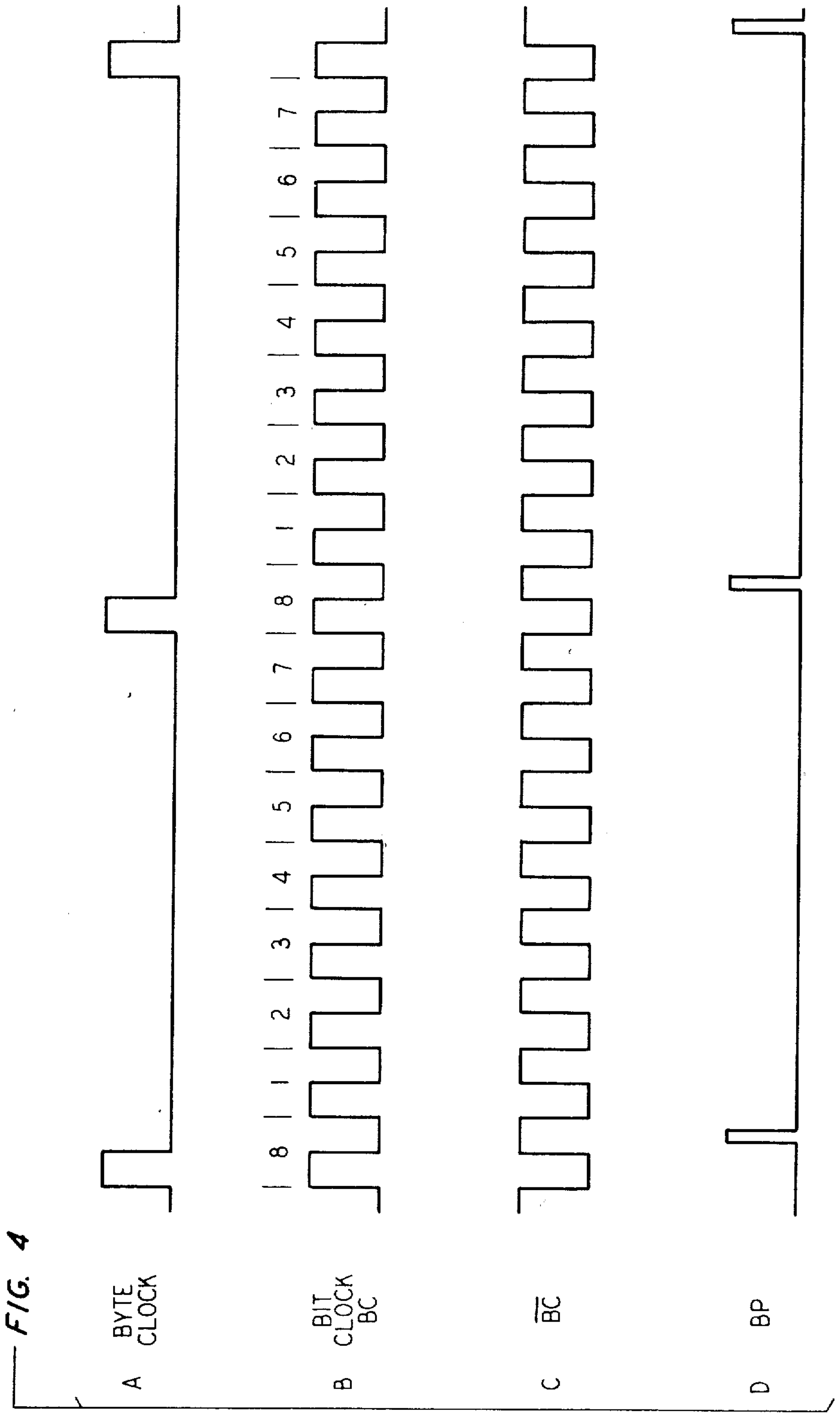
FIG. 4 depicts timing waves produced by clocking equipment shown or indicated in FIGS. 2 and 3.

Input signals to three-branch unit 200A are provided by the incoming paths of branches BR0, BR1 and BR2 and incoming clock leads 232 and 229. clock leads 232 and 229 extend to the office reference clock (not shown), deriving therefrom the bit clock and byte clock pulses, which are shown as timing waves A and B, respectively, in FIGS. 4A and 4B of the copending application of A. C. Carney et al and similarly shown as timing waves A and B in FIG. 4 of this application. These clock pulses are applied to clock circuit 227A and, more specifically, the bit clock pulse on clock lead 232 is applied to bit clock circuit 203A and the byte clock pulse on clock lead 229 is applied to byte clock circuit 207A.

Broadly, it is the function of clock circuit 227a to develop appropriate timing pulses for the functioning of the multipoint junction unit in three-branch unit 200A. In addition, bit clock circuit 203A and byte clock circuit 207A repeat the bit and byte clock pulses on leads 232 and 229 and apply them to leads 230 and 231, respectively, for application to clock circuit 227B in two-branch unit 200B. Bit clock circuit 203A also repeats the bit clock pulse and applies it to lead BC. In addition, bit clock circuit 203A inverts the bit clock pulse and applies the inverted pulse, shown as timing wave C of FIG. 4, to lead $\overline{BC}$. Byte clock circuit 207A responds to the byte clock pulse by producing a narrow pulse following the trailing edge of the byte clock pulse, as shown in timing wave D of FIG. 4, which pulse is applied to lead BP.

The data from station 104, which is passed by way of the incoming path of branch BRO to the multipoint junction unit, is applied to incoming data circuit 238A. The data on the incoming paths from branches BR1 and BR2 are applied to incoming data circuits 239A and 240A, respectively. The principal common function of the incoming data circuits during the normal mode of the multipoint junction unit is to repeat the incoming data bytes applied thereto and pass the repeated data bytes to the gate matrix. In addition, each incoming data circuit detects the eighth bit of each incoming byte, determines if the byte is a control byte (eighth bit is a 0), and converts the control byte to an All 1's byte; each incoming data circuit thereby blocking (or converting to All 1's) control bytes when the multipoint junction is in a normal mode and being transparent to the data bytes. Incoming data circuit 238A differs from the other incoming data circuits only insofar as it additionally disassembles each byte and applies the parallel bits of the byte to test circuit 228 via cable 204A, and, additionally, passes the incoming bit stream to lead SRI, which lead applies the incoming data to multipoint junction unit 200B, The data from the incoming paths of branches BR3 and BR4 are passed to incoming data circuits 239B and 240B, respectively. At the same time, the data stream repeated by incoming data circuit 238A and passed to lead SRI is passed to incoming data circuit 238B. Incoming data circuits 238B, 239B and 240B operate in the same manner as incoming data circuits 238A, 239A and 240A with respect to incoming data. The bytes disassembled by incoming data circuit 238A are applied to cable 204A and passed to test circuit 228A, which thereby monitors the incoming bytes from branch BRO. Test circuit 228B similarly monitors these incoming bytes. As described in further detail hereinafter, test circuits 228a and 228B define the several modes of the multipoint junction unit and determine the branch or branches to be selected when the units are in the test mode. These determinations are provided to leads C1, C2 and AZ', which leads are passed back to the incoming data circuits.

When the test mode is intiated, the test circuits advise the incoming data circuits by way of the above-described leads and the incoming data circuits block all incoming bytes. This is done by converting all the bytes (both data and control bytes) to All 1's data bytes. When thereafter a branch is selected, the junction unit repeats all the incoming bytes, data and control, from branch BRO and from the selected branch. For example, assuming that the selected branch is branch BR1, incoming data circuits 238A and 239A, in response to indications on the above-mentioned test circuit leads, repeat without conversion all incoming data and control bytes from branches BR0 and BR1 and these repeated bytes are passed through to the gate matrix as previously done in the data mode. Of course, if either branch BR3 or BR4 is selected, the incoming data circuit of that branch together with incoming data circuit 238B would pass all the bytes. In either event the other incoming data circuits not affected continue to block (or convert) all incoming bytes.

Outgoing data circuits 243A, 241A, 242A, 241B and 242B are connected to the outgoing paths of branches BR0, BR1, BR2, BR3 and BR4. Each outgoing line circuit retimes and repeats data bytes applied thereto and passes them to the associated path. The data bytes that are so applied thereto are obtained from the gates of the gate matrix. The gate matrix thus passes the repeated bytes from the incoming data circuits to the outgoing data circuits.

When the multipoint junction unit is in the normal data mode, the gate matrix broadcasts the repeated bytes from each incoming data circuit to outgoing data circuits connected to other branches. When the junction unit is in the test mode, the gate matrix blocks the broadcast of data signals to the outgoing data circuits. Finally, when a branch is selected, the gate matrix removes the blockage of the selected branch.

Gate 245A, in the gate matrix, applies its output to outgoing data circuit 241A, which passes data to the outgoing path of branch BR1. Four inputs to gate 245A are connected to leads 234, 235, 236 and 237A. These leads convey the data output of incoming data circuits 240A, 239B, 240B and 238A which, are previously described, are connected to the incoming paths of branches BR2, BR3, BR4 and BR0. The other input of gate 245A is connected to lead C1 which, as described hereinafter, normally has applied thereto an enabling potential, with the exception of the test mode wherein an enabling potential is applied only when branch BR1 is selected. Therefore, during the data mode of the junction unit, gate 245A passes to outgoing data circuit 241A and thus to branch BR1 incoming data received from any one of the other branches, it being noted that an idle branch sends All 1's and that the gate therefore passes 0 bits from the transmitting branch. When the junction unit is in the test mode, a disabling potential is initially applied to lead C1, disabling the gate. The passage of data to branch BR1 is therefore blocked and the outgoing path of branch BR1 is thus disconnected from the incoming data circuits of the other branches. If branch BR1 is the selected branch, an enabling potential is reapplied to lead C1, allowing data received from branch BR0 and repeated by incoming data circuit 238A to be passed to outgoing data circuit 241A and thus to branch BR1.

Similarly, gate 246A passes data to outgoing data circuit 242A and thus to the outgoing path of branch BR2, while inputs to the gate are connected via leads 233, 235, 236 and 237A to the incoming data circuits of branches BR1, BR3, BR4 and BR0. The outgoing path of branch BR2 thus receives data from each of the other branches. The other input to gate 246A is lead C2, which disables the gate during the test mode except when branch BR2 is selected. Gate 247A passes data from branches BR1 to BR4 to outgoing data circuit 243A and thus to branch BR0. The other input to gate 274A is connected to gate 248A, which passes back the answerback signals to branch BRO, as described hereinafter.

Accordingly, each incoming data circuit is connected to gates, in the gate matrix, which pass data to the other branches. The matrix, therefore, broadcasts data from any branch to all of the other branches, blocks the broadcasting to the outgoing paths of the branches when the junction unit is in the test mode, re-enabling broadcasting to the selected branch. It is noted that in the test mode the gate matrix does not block the passage of data to branch BRO, to permit answerbacks in the test mode and interconnection with the selected branch.

Inputting to test circuit 228A consists of data, address and control bytes derived from incoming data circuit 238A over cable 204A together with timing signals on leads BP and $\overline{BC}$. In general, test circuit 228A decodes the incoming bytes, determines when a test mode is to be initiated, and sets the multipoint junction unit in the test mode state, selects the branch (BR1 or BR2) to be unblocked, and generates the various "answerback" bytes.

The answerback bytes generated by test circuit 228A are applied to output lead ANS A and passed to gate 248A in the gate matrix to be repeated, as previously described, to the outgoing path back of branch BRO. Signals from test circuit 228A, which define the selected ones and blocked ones of the branches are passed by way of output leads C1 and C2 to the incoming data circuits. The indication defining the test mode condition is passed by way of lead AZ' to the incoming data circuits. Finally, various signals, described further hereinafter, defining appropriate interrelationships of test circuit 228A in unit 200A and test circuit 228B in unit 200B, are exchanged by way of leads BLI1 through BLI4 and cable 223.

Test circuit 228B is arranged in the same manner as test circuit 228A, monitoring the bytes on cable 204B received from incoming data circuit 238B. It therefore determines the initiation of a test mode concurrently with test circuit 228A and differs only insofar as it does not answerback for the general "test alert" signals and selects branch BR3 or BR4, defines this selection of its leads C1 and C2 and answers this selection on lead ANS B which extends to gate 248A. It also communicates with test circuit 228A via leads BLI1 to BLI4.

The circuit components for incoming line circuit 238A comprise line terminator 201A, shift register 202A and converter 244A. Incoming line circuit 238B in two-branch unit 200B is arranged and operates in substantially the same manner as incoming line circuit 238A with the exception that it does not include a line terminator corresponding to line terminator 201A. The circuit components for incoming line circuits 239A and 240A comprise line terminators 211A and 212A, shift registers 213A and 214A and converters 209A and 210A. Incoming line circuits 239B and 240B are arranged and operate in substantially the same manner as incoming line circuits 239A and 240A.

Data bytes from branch BRO which are received by incoming line circuit 238A are applied to line terminator 201A. Line terminator 201A converts these incoming line signals to data bits and serially applies them to shift register 202A and to lead SR1 which extends to the input of shift register 202B in incoming line circuit 238B.

Incoming signals from branch BR1 which are received by incoming line circuit 239A are applied to line terminator 211A. Similarly, incoming signals from branch BR2 which are received by incoming line circuit 240A are applied to line terminator 212A. Each of line terminators 211A and 212A repeats the serial data bits of the data bytes to shift registers 213A and 214A, respectively.

Shift registers 202A, 213A, and 214A (and similarly shift registers 202B, 213B and 214) are substantially identical, each having a plurality of stages sufficient in number to store the eight bits of a byte. The incoming data bit stream is shifted in and through the several stages of the shift registers in response to bit clock pulses derived from lead BC. The serial outputs of the last stages of shift registers 202A, 213A and 214A are passed to converters 244A, 209A and 210A, respectively. At the same time, the condition of the first stage of the shift register and therefore the eighth bit of the data byte is passed from each of shift registers 202A, 213A and 214A to converters 244A, 209A and 210A. Shift register 202A differs from shift registers 213A and 214A only insofar as the data bits in each byte stored in the several stages of shift register 202A are read out in parallel through cable 204A to test circuit 228A.

When the multipoint junction unit is in the normal mode (enabling potentials on leads C1 and C2 and no energizing potential on lead AZ'), it is the function of each converter circuit to repeat each data (or address) byte and to convert each control byte to an All 1's data byte. More specifically, if the bit in stage one of a shift register is a 0 bit when the byte timing pulse on lead BP is applied to the converter circuit, it is indicated that the eighth bit is a 0 bit and the byte is a control byte. The converter circuit thereupon converts all the bits of the byte being serially shifted out of the shift register to 1 bits. If, however, the eighth bit is a 1 bit, the output of the shift register is repeated by the converter circuit without conversion. Advantageously, the function of converting the byte to 1 bits or repeating the byte without conversion is provided by gating circuitry such as NAND gates. The output bits of each converter circuit are then passed to the gate matrix.

When the test mode is initiated, both of leads C1 and C2 have disabling potentials applied thereto (lead AZ' still has no energizing potential thereon). Converter circuit 244A recognizes that both of leads C1 and C2 have disabling potentials; converter 209A recognizes that lead C1 has a disabling potential and converter 210A recognizes that lead C2 has a disabling potential. All these converters thereupon convert both the control bytes and data bytes applied thereto to All 1's bytes and the result thereof is to block the application of data to the gate matrix.

When the multipoint junction unit is in the test mode, lead AZ' has an energizing potential applied thereto and, assuming that branch BR1 or BR2 is selected, one of leads C1 and C2 has an enabling potential and the other has a disabling potential applied thereto. Assuming that branch BR1 is selected, lead C1 has an enabling potential. Converter 244A recognizes that one or the other but not both of leads C1 and C2 have an enabling potential (an exclusive-OR function) and thereupon repeats the output bit stream over shift register 202A without conversion and without regard to the condition of the eighth bit of each byte. Converter 244A is thus rendered transparent to both data and control bytes. Converter 209A recognizes that lead C1 has an enabling potential applied thereto and lead AZ' has an enabling potential thereon (an AND function). Converter 209A thereupon repeats the output bit stream of shift register 213A, without regard to the eighth bit.

The output bit stream of the timing buffer is passed to the line driver. Each line driver, such as line driver 241A, retimes each bit under control of the clock pulses on lead $\overline{BC}$ and repeats the bit to an output path. As seen in FIG. 2, line driver 217A applies the repeated bits to outgoing path of branch BR1. Line driver 218A applies the repeated bit stream to branch BR2 and line driver 220A repeats the bit stream to the outgoing path of branch BR0.

The principal components of test circuit 228A comprise translation circuit 205A, logic circuit 206A and coded answer back circuit 208A. The bits of the incoming bytes applied to incoming data circuit 238A and passed, in parallel, through cable 204A to test circuit 228A, as previously described, are applied to translation circuit 205A. It is noted that these bits constitute bits 2 through 8, the first bit not being significant to identify the byte. Translation circuit 205A provides conventional translation functions when operated by the pulse on lead BP which, as previously described, is derived from the byte clock pulse. The translation functions comprise recognition of various bytes and, in response thereto, momentary energization of corresponding ones of output leads.

The codes recognized by translation circuit 205A and the output leads thereby energized are summarized below:

| Byte Identification | Output Lead Energized |
|---|---|
| Test Alert (TA) | TA |
| MJU Alert (MA) | MA |
| Idle | IDL |
| All 0's | AZ |
| Branch 1 (BR1) | BR1 |
| Branch 2 (BR2) | BR2 |

The several output leads of translation circuit 205A extend to inputs of logic circuit 206A. In general, logic circuit 206A is controlled by the energization of the various output leads of translation circuit 205A to place multipoint junction unit 200A in its various operating modes; to provide enabling of coded answerback circuit 208A to return the several answerback bytes; and to intercommunicate with test circuit 228B in multipoint junction unit 200B by way of leads BLI1 to BLI4, for purposes described hereinafter. The details of the structure of logic circuit 206A is disclosed in FIG. 3 of the above-noted Fitch et al. application.

Coded answerback circuit 208A is a conventional code generating circuit arranged to generate each of four answerback bytes, as determined by the energization of leads from logic circuit 206A, and to serially apply the bits of the bytes to lead ANSA under control of bit clock pulses on lead $\overline{BC}$. More specifically, coded answerback circuit 208A is enabled to generate an answerback byte so long as an enabling potential is on output lead STM of logic circuit 206A and a disabling potential is on lead AZ', the particular byte generated being determined by leads TA, MA, BR1 and BR2, as further described hereinafter.

Test circuit 228B in multipoint junction unit 200B is arranged in substantially the same manner as test circuit 228A, with the exception that the translation circuit 205B therein is arranged to recognize the branch BR3 and branch BR4 selection codes and coded answerback circuit 208B is limited to the generation of the branch BR3 and branch BR4 answerback codes.

Assume now that a test sequence is initiated by the remote signaling unit 150. This first byte of the sequence is the TA control byte. As previously described, the control byte is received by incoming data circuit 238A and the bits of the byte are passed by way of cable 204A to translation circuit 205A. Translation circuit 205A, upon the application of the timing pulse on lead BP, momentarily energizes output lead TA. Logic circuit 206A, in response thereto, energizes lead STM, momentarily energizes lead TA, and applies disabling potentials to leads C1 and C2. The application of the disabling potentials to both leads C1 and C2 enables all the converters to convert or block incoming data and control bytes and disables gates 245A and 246A to block the outgoing paths of branches BR1 and BR2, as previously described. The energization of lead STM enables coded answerback circuit 208A and, in response to the momentary energization of lead TA, coded answerback circuit 208A generates the sequence of bits corresponding to the TA control byte and serially applies these bits to output lead ANS(A) for application back to branch BRO by way of gates 248A and 247A. At the same time, the TA control byte is received by incoming data circuit 238B and recognized by translation circuit 205B. Logic circuit 206B, in response to this recognition, applies disabling potentials to output leads C1 and C2 to enable converters 209B, 210B and 244B to convert data and control bytes and to disable gates 245B and 246B to block branches BR3 and BR4.

The next code byte in the test sequence from signaling unit 150 is the MJU Alert (MA) byte. Translation circuit 205A, in response to this byte, momentarily energizes lead MA and logic circuit 206A responds thereto by momentarily energizing its output lead MA. Logic circuit 206A maintains energized output lead STM and maintains the disabling potentials on leads C1 and C2. coded answerback circuit 208A is enabled to generate a hub identification (HID) control byte, serially applying the bits of the byte to lead ANS(A) for transmission back to signaling unit 150. Test circuit 228B provides no function at this time with the exception that disabling potentials are maintained on output leads C1 and C2.

After signaling unit 150 transmits a predetermined number of MA bytes, the branch selection code byte is transmitted to select the appropriate branch. Assuming the branch BR1 selection code byte is transmitted, translation circuit 205A momentarily energizes output lead BR1. Logic circuit 206A, in response thereto, stores the indication that the branch BR1 byte has been received and momentarily energizes its output lead BR1. Lead STM is maintained energized and coded answer back circuit 208A generates and returns to signaling unit 150 the branch BR1 selection code byte. Similarly, if a selection code for another branch is received at that time, the appropriate logic circuit (logic circuit 206A or logic circuit 206B) stores the indication thereof and operates the associated coded answerback circuit to return the corresponding selection code to signaling unit 150. In addition, the logic circuit storing the indication applies appropriate potentials to a selected one of leads BLI1 through BLI4 to advise the other logic circuit that a branch selection code has been received and the indication thereof has been stored. More specifically, upon the reception of the branch BR1 selection code, logic circuit 206A energizes lead BLI1 and logic circuit 206B is therefore advised of the storage of the branch selection code by logic circuit 206A. Similarly, other storage indications are interchanged by the logic circuits so that each logic circuit is advised when the other logic circuit has stored an indication that a branch selection code byte has been received.

As described in the Fitch et al. application, one code or several codes in sequence can be received and stored by the logic circuits which, in turn, operate the associated coded answerback circuit to send the corresponding byte back to signaling unit 150.

After the branch selection code or codes have been transmitted, signaling unit 150 sends the All 0's byte. Translation circuit 205A (and translation circuit 205B) momentarily energizes output lead AZ. Logic circuits 206A and 206B are presently "primed" to recognize the momentary energization of input lead AZ by the prior storage of the indication of the reception of a branch selection code, it being noted that both logic circuits are so primed as a result of the intercommunication by way of leads BLI1 through BLI4. Primed logic circuit 206A (and logic circuit 206B) therefore energizes output lead AZ' and at the same time provides an enabling potential or enabling potentials to appropriate ones of output leads C1 and C2, in accordance with the previously received branch selection codes. This, as previously described, unblocks the branch or branches to be selected and eliminates the converting function of the appropriate ones of the converter circuits 209A, 209B, 210A, 210B, 244A and 244B, whereby the selected branch or branches and branch BR0 are enabled to transmit and receive both data and control bytes. Logic circuit 206A also applies a disabling potential to the lead AZ' which extends to coded answerback circuit 208A and this disabling potential of the AZ' lead disables the coded answerback circuit to preclude the generation of further answerback signals. Thus, the selected branch or branches are unblocked in both directions and signaling unit 150 can communicate therewith to test units on the branch, for example, or to selectively communicate with units on the branch or branches, or to send additional sequences to select a branch further "downstream", but in series with the selected branch.

At the termination of the communication, signaling unit 150 sends the Idle control byte. The translation circuit momentarily energizes output lead IDL and logic circuit 206A, in response thereto, returns to its initial condition. The energization of output leads STM and AZ' is removed and enabling potentials are applied to output leads C1 and C2. The multipoint junction unit is now restored to its normal mode.

Figure 5:
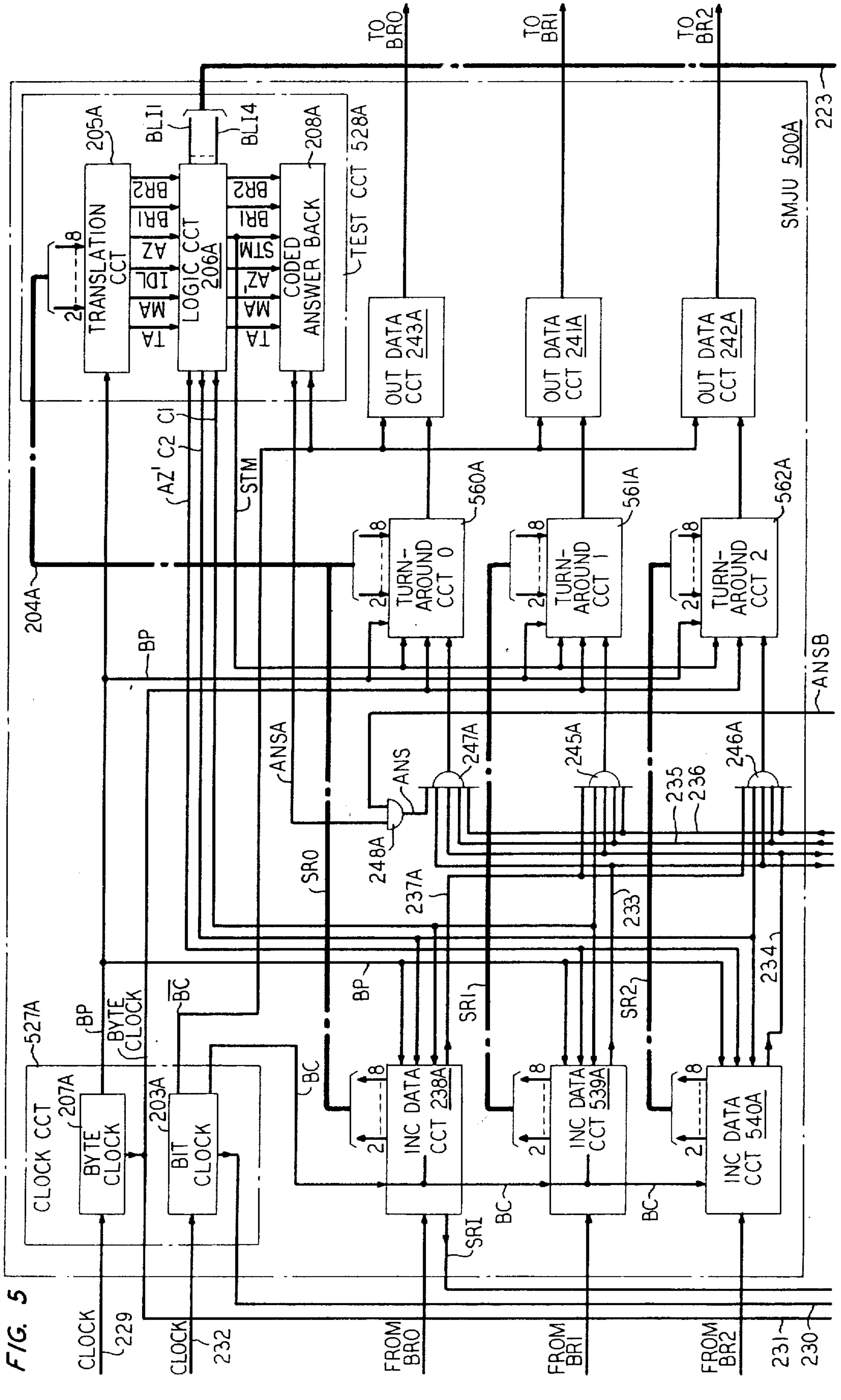
FIGS. 5 and 6, when vertically aligned, disclose, in schematic form, the details of circuitry and equipment of a five-branch symmetrical junction unit arranged to communicate with half-duplex stations.
Figure 6:
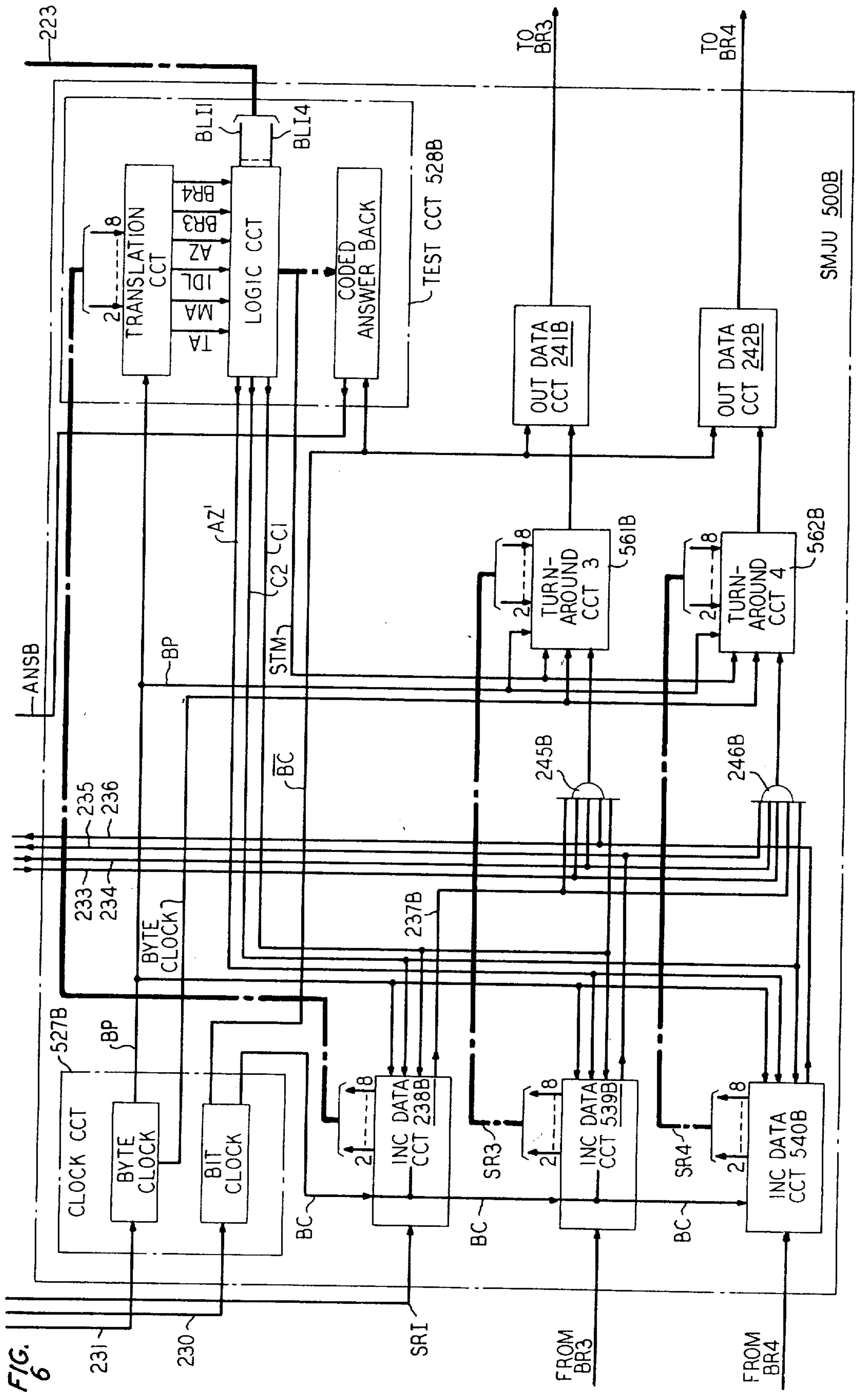

The 5-branch symmetrical multipoint junction unit shown in FIGS. 5 and 6 is utilized when the stations can only accommodate half-duplex signaling and wherein it is necessary to provide full-duplex signaling between branches for testing or housekeeping purposes. Multipoint junction unit 500A is similar to multipoint junction unit 200A insofar as it includes incoming data circuits, outgoing data circuits, an interconnecting gate matrix, a clock circuit and a test circuit.

The outgoing data circuits and the gate matrix circuitry are identical to junction unit 200A and are identically identified. The circuitry of clock circuit 527A is also identical to clock circuit 227A with the exception that the repeated byte clock pulse (waveform A, FIG. 4) applied by byte clock 207A to lead 231 is also applied to a lead identified as the Byte Clock lead.

Test circuit 528A is identical to test circuit 228A with the exception that output lead STM of logic circuit 206A extends externally from test circuit 528A to other circuitry in the junction unit.

Finally, it is noted that incoming data circuit 238A is identical to the correspondingly identified incoming data circuit in junction unit 200A and that incoming data circuits 539A and 540A are identical to incoming data circuits 239A and 240A with the exception that the bits in stages 2 through 8 of the shift registers therein are monitored, as described hereinafter, in substantially the same way as the bits in corresponding stages of the shift register in incoming data circuit 238A are monitored.

The principal modification of junction unit 500A is the interpositioning of turn-around circuits between the gate matrix and the outgoing data circuits. More specifically, the output of gate 247A is now applied to the input of turn-around circuit 560A and the output of turn-around circuit 560A is passed on to outgoing data circuit 243A. Similarly, turn-around circuits 561A and 562A are now interposed between gates 245A and 246A and outgoing circuits 241A and 242A.

Multipoint junction unit 500B is similarly modified with respect to the incoming data circuits, the clock circuit and the test circuit. In addition, multipoint junction unit 500B is further modified by the interpositioning of turn-around circuits between the gate matrix and the outgoing data circuits.

The principal function of each turn-around circuit is to limit communication on any branch to half-duplex signaling; that is, that each branch may communicate one way at a time by either sending into the junction unit or receiving signals broadcast by the junction unit. More specifically, the turn-around circuit monitors the incoming signals from each branch and, when any signals other than idle signals are being received, precludes the broadcasting therethrough of signals to the outgoing path of the branch.

Turn-around circuit 560A monitors the incoming bits in stages 2 through 8 of the shift register in incoming data circuit 238A. Assuming the junction unit is not in the test mode, as indicated by the potential on lead STM, turn-around circuit 560A normally blocks signals from gate 247A. In addition, in response to the clock pulse on lead BP, turn-around circuit 560A detects whether or not an incoming byte from branch BR0 is an all 1's byte or an Idle byte. These bytes designate a non-signaling idle condition on the branch, as previously discussed, and turn-around circuit 560A thereupon repeats signals from gate 247A to outgoing data circuit 243A. This condition is then removed at the end of the byte by the pulse on lead Byte Clock, the turn-around circuit restores to the normal blocking condition, and the cycle is then repeated for the next byte. In the test mode, however, the energizing potential on lead STM disables the above-described circuits, permitting the data output of gate 247A to pass to outgoing data circuit 243A. Thus, branch BR0 provides half-duplex signaling in the normal mode and full-duplex signaling in the test mode. Each of the other turn-around circuits similarly provide half-duplex signaling in the normal mode and full-duplex signaling in the test mode.

Figure 7:
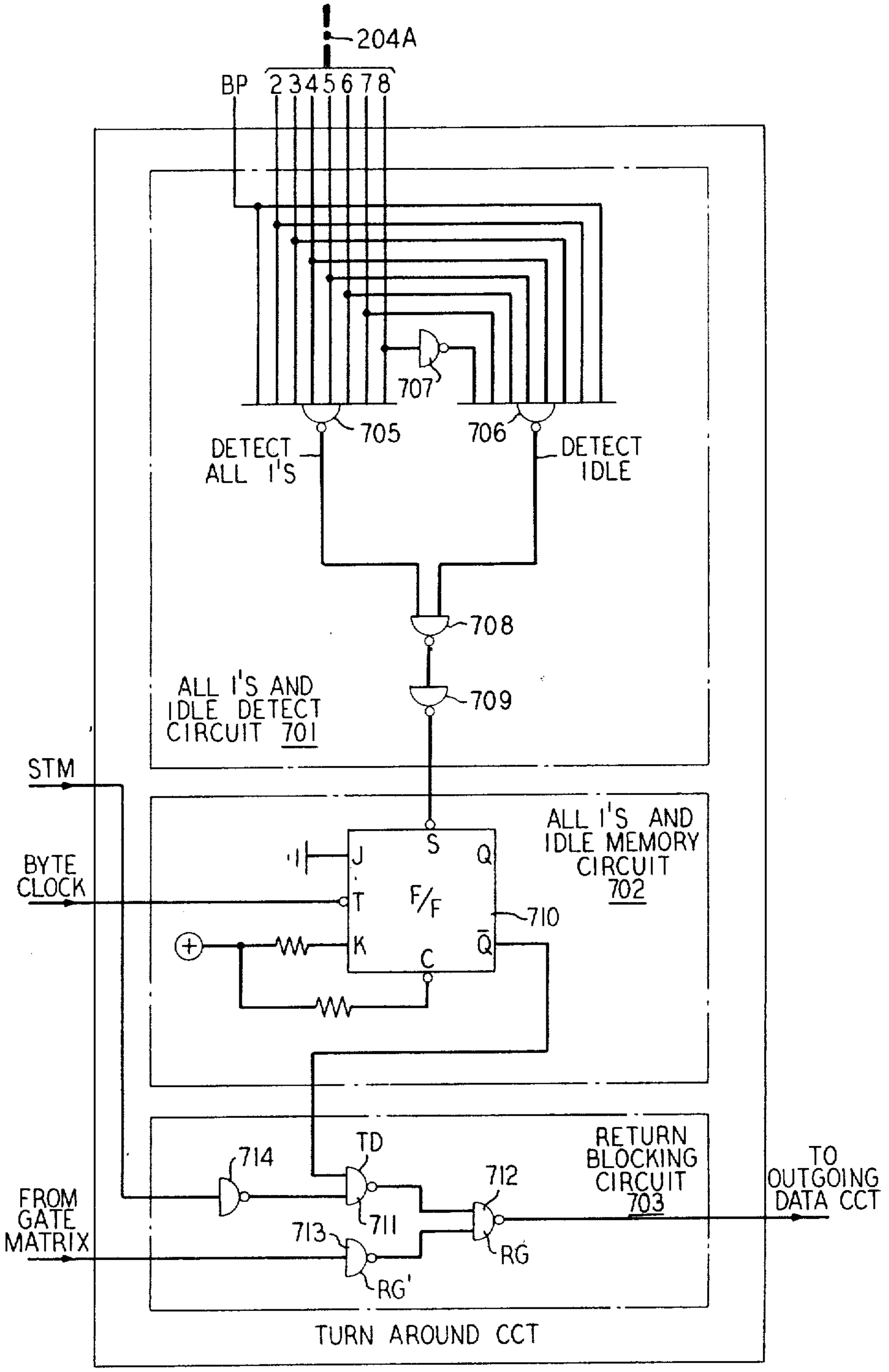
FIG. 7 shows, in schematic form, the details of the circuitry of equipment which arranges the junction unit shown in FIGS. 5 and 6 to communicate with half-duplex line loops.

A typical turn-around circuit is shown in FIG. 7. The All 1's byte and the Idle byte are detected by detect circuit 701. This circuit includes gates 705, 706 and 708 and inverters 707 and 709. Bits 2 through 7, derived from the incoming data circuit shift register via cable 204A, for example, are applied to inputs of gates 705 and 706. Bit 8 is also applied to gate 705 and the inversion thereof is applied to gate 706 by way of inverter 707. Finally, the BP pulse is applied to gates 705 and 706. Thereafter, upon the application of the BP pulse, if all the bits are 1's, the output of gate 705 goes low, indicating the reception of an All 1's byte. Similarly, if an Idle byte is received when the BP pulse is applied to gate 706, its output goes low. The inputs to gate 708 are, therefore normally high with the exception of the times that an All 1's or an Idle byte is received by the branch. The output of gate 708 is therefore normally low and the output of inverter 709 is normally high, with the exception of the times that an All 1's byte or an Idle byte is received.

The output of gate 709 is connected to the input of flip-flop 710 in memory circuit 702. Accordingly, when an All 1's byte or an Idle byte is received a negative pulse of the output of inverter 709 sets flip-flop 710. Flip-flop 710 is thereafter toggles back to the CLEAR condition by the negative transition of the clock pulse on the Byte Clock lead. As a result, flip-flop 710 is noramlly maintained in the CLEAR condition but operated to the SET condition during the interval that the incoming data circuit is repeating the All 1's or the Idle byte to the gate matrix.

As noted above, flip-flop 710 is normally in the CLEAR condition. It therefore applies a high potential from its $\overline{Q}$ output to one input of gate 711 in blocking circuit 703. The other input to gate 711 is connected by way of inverter 714 to lead STM. As previously described, lead STM is normally de-energized when the junction unit is in the normal data mode. This condition, being inverted by inverter 714, results in the application of a high condition to gate 711. Both conditions to gate 711 being high, it applies, in turn, a low or disabling condition to gate 712. With gate 712 disabled, data from the gate matrix inverted by inverter 713 is blocked and does not pass to the outgoing data circuit.

Assume now that an All 1's or Idle byte is received by the branch. Flip-flop 710 is thereupon set and the $\overline{Q}$ output goes low. Under this condition the output of gate 711 goes high and gate 712 is enabled. Data from the gate matrix can now pass through gate 712 to the outgoing data circuit since it has been determined that no incoming data is being received from this branch.

When the junction unit goes to the test mode, lead STM becomes energized, inverter 714 applies a low potential to gate 711 and its output goes high to enable gate 712. Accordingly, when the junction unit is in the test mode, gate 712 is enabled regardless of the incoming signals from the branch. The junction unit therefore permits full-duplex signaling; that is, incoming signaling from the branch and simultaneous outgoing braodcasting to the branch.

Although a specific embodiment of this invention has been shown and described, it will be understood that various modifications may be made without departing from the spirit of this invention.

We claim:

1. A junction unit interconnecting a plurality of two-way branch lines, one of the branch lines extending to control equipment, the junction unit comprising, means for repeating signals received from each of the branch lines, means for broadcasting the repeated signals to all of the other branch lines, means for blocking the repeated signals, means for distinguishing between the reception of data signals and control signals from each of the branch lines and for enabling the blocking means in response to the reception of control signals, and means responsive to branch line selection signals received from the branch line extending to the control equipment for disabling the distinguishing means of the selected branch line and of the control branch line and for enabling the blocking means of each unselected branch line whereby the control branch line and the selected branch line are enabled to interchange both data and control signals.

2. A junction unit, in accordance with claim 1, wherein the broadcasting means includes means responsive to the selection signal responsive means for precluding the broadcast of signals to the unselected branch lines.

3. A junction unit, in accordance with claim 2, wherein the broadcasting means comprises gating means for interconnecting an outgoing side of each branch line to the repeating means of the other branch lines and the precluding means includes means for disabling the gating means connected to the outgoing sides of the unselected branches.

4. A junction unit, in accordance with claim 2, and further including means connected to each of the branch lines for limiting the reception of signals by and the broadcasting of signals to the branch line to one way at a time and wherein the selection signal responsive means includes means for disabling the limiting means.

5. A junction unit interconnecting a plurality of two-way branch lines, one of the branch lines extending to selection signaling equipment, the junction unit comprising, means for broadcasting data signals received from each of the branch lines to all of the other branch lines, means connected to each of the branch lines for limiting the reception of signals from and the broadcasting of signals to the branch line to one way at a time, and means responsive to the reception of predetermined branch line selection signals from the equipment branch line for disabling the limiting means connected to the equipment branch line and connected to the selected branch line and for precluding the broadcasting of signals to each of the unselected branch lines whereby exclusive and simultaneous two-way communication between the control line and the selected branch line is provided.

6. A junction unit, in accordance with claim 5, wherein the broadcasting means comprises gating means for interconnecting an outgoing side of each branch line to incoming sides of the other branch lines and the precluding means includes means for disabling the gating means connected to the outgoing sides of the unselected branches.

7. A junction unit, in accordance with claim 5, wherein the limiting means includes means responsive to the reception of signals from an incoming side of each branch for blocking the broadcasting of signals to an outgoing side of the branch.

8. A junction unit, in accordance with claim 7, wherein each branch conveys data bytes, certain ones of the bytes being representative of idle conditions, and wherein the blocking means is responsive to the reception of the idle condition bytes.

* * * * *